United States Patent
Roth et al.

(10) Patent No.: US 10,148,629 B1
(45) Date of Patent: Dec. 4, 2018

(54) USER-FRIENDLY MULTIFACTOR AUTHENTICATION

(71) Applicant: AMAZON TECHNOLOGIES, INC., Reno, NV (US)

(72) Inventors: Gregory Branchek Roth, Seattle, WA (US); Ian Nicholas Wesley-Smith, Seattle, WA (US); Cristian M. Ilac, Sammamish, WA (US); Patrick James Ward, Snoqualmie, WA (US)

(73) Assignee: Amazon Technologies, Inc., Reno, NV (US)

( * ) Notice: Subject to any disclaimer, the term of this patent is extended or adjusted under 35 U.S.C. 154(b) by 656 days.

(21) Appl. No.: 14/034,527

(22) Filed: Sep. 23, 2013

(51) Int. Cl.
*H04L 29/06* (2006.01)

(52) U.S. Cl.
CPC .......... *H04L 63/08* (2013.01); *H04L 63/083* (2013.01); *H04L 63/0838* (2013.01); *H04L 2463/081* (2013.01); *H04L 2463/082* (2013.01)

(58) Field of Classification Search
CPC ..... H04L 63/061; H04L 63/08; H04L 63/083; H04L 63/8383; H04L 2463/081; H04L 2463/082; H04L 63/0838
See application file for complete search history.

(56) References Cited

U.S. PATENT DOCUMENTS

| 8,346,742 B1* | 1/2013 | Juels ................. G06F 21/577 707/698 |
| 8,776,176 B2 | 7/2014 | Stebila et al. |
| 8,806,205 B2 | 8/2014 | Metke et al. |
| 8,953,790 B2* | 2/2015 | Qi ...................... G06F 21/602 380/44 |
| 9,130,753 B1* | 9/2015 | Kronrod ............... H04L 9/30 |
| 2004/0172531 A1* | 9/2004 | Little ................. G06F 21/335 713/155 |
| 2005/0144459 A1* | 6/2005 | Qureshi ............. H04L 63/083 713/176 |
| 2007/0011724 A1* | 1/2007 | Gonzalez ............ G06F 21/31 726/4 |
| 2011/0289564 A1* | 11/2011 | Archer ................ G06F 21/40 726/5 |
| 2012/0089519 A1* | 4/2012 | Peddada ........... G06Q 20/3829 705/71 |
| 2013/0024919 A1* | 1/2013 | Wetter ............... G06F 21/335 726/6 |
| 2013/0080769 A1* | 3/2013 | Cha .................. H04L 63/168 713/155 |
| 2013/0347089 A1 | 12/2013 | Bailey et al. |
| 2014/0181894 A1* | 6/2014 | Von Bokern .......... H04L 63/061 726/1 |
| 2014/0201517 A1* | 7/2014 | Corrion ............. H04L 63/0838 713/155 |

(Continued)

*Primary Examiner* — Hadi S Armouche
*Assistant Examiner* — Alexander R Lapian
(74) *Attorney, Agent, or Firm* — Robert C. Kowert; Meyertons, Hood, Kivlin, Kowert & Goetzel, P.C.

(57) ABSTRACT

An application executing on a user device can receive a request to access a remote computer system. The application can automatically obtain an authentication code that is generated based at least in part on a seed value, which can be stored in the user device. The application can automatically generate an authentication request based at least in part on the access information and the authentication code, and transmit the authentication request to remote computer system.

24 Claims, 9 Drawing Sheets

(56) References Cited

U.S. PATENT DOCUMENTS

2015/0058941 A1* 2/2015 Lyman .................... H04L 63/08
                                                    726/6
2015/0312242 A1* 10/2015 Ogawa .................... G06F 21/34
                                                    726/6

* cited by examiner

USER-FRIENDLY MULTIFACTOR AUTHENTICATION

BACKGROUND

Security is an important aspect of remote computing environments. For example, a web service may require a user to be authenticated in order to access the web service. Often, a remote computer system requires a user to provide multiple factors for authentication. Authentication may use one, two, or more independent factors to identify the user. For example, the user may be required to enter a user name and password as well as provide some other type of authentication information, such as a numeric code based on a shared secret of the user and the remote computer system.

While providing increased security for both the user and remote computer, the multifactor authentication can be burdensome on the user. Each extra piece of information required from the user adds additional time to the user's access attempts. Additionally, a user may utilize a mobile device to access the remote computer system. Due to the reduced input ability of mobile devices entering information, such as a numeric code in addition to a user name and password, can be difficult for the user.

BRIEF DESCRIPTION OF THE DRAWINGS

Various features of the implementations can be more fully appreciated, as the same become better understood with reference to the following detailed description of the implementations when considered in connection with the accompanying figures, in which.

DETAILED DESCRIPTION

Implementations of the present disclosure are directed to systems and methods for providing user-friendly, multifactor authentication. According to implementations, an application, for accessing a remote computer resource, can automatically obtain a multifactor authentication code for accessing the remote computer resource, without user interaction. To achieve this, the application or resources on the user device can securely store a seed value to be used to generate the multifactor authentication code. When a user requests access using the application, the application (or other resources of the user device) can automatically generate the multifactor authentication code that is based on the stored seed value. The application can then generate an authentication request. Accordingly, the user is not required to input the authentication code.

For example, a web services console application can provide a user-friendly multifactor authentication process for accessing a web service from a mobile device. When a user attempts to access the web service using the console application, the console application can obtain an authentication code based on a seed value that is securely maintained by the console application. The console application can then generate an authentication request with the authentication code and other user access information. Accordingly, the console application can support multifactor authentication on the mobile device without requiring the user to input authentication codes using limited input devices of the mobile device.

Figure 1A:
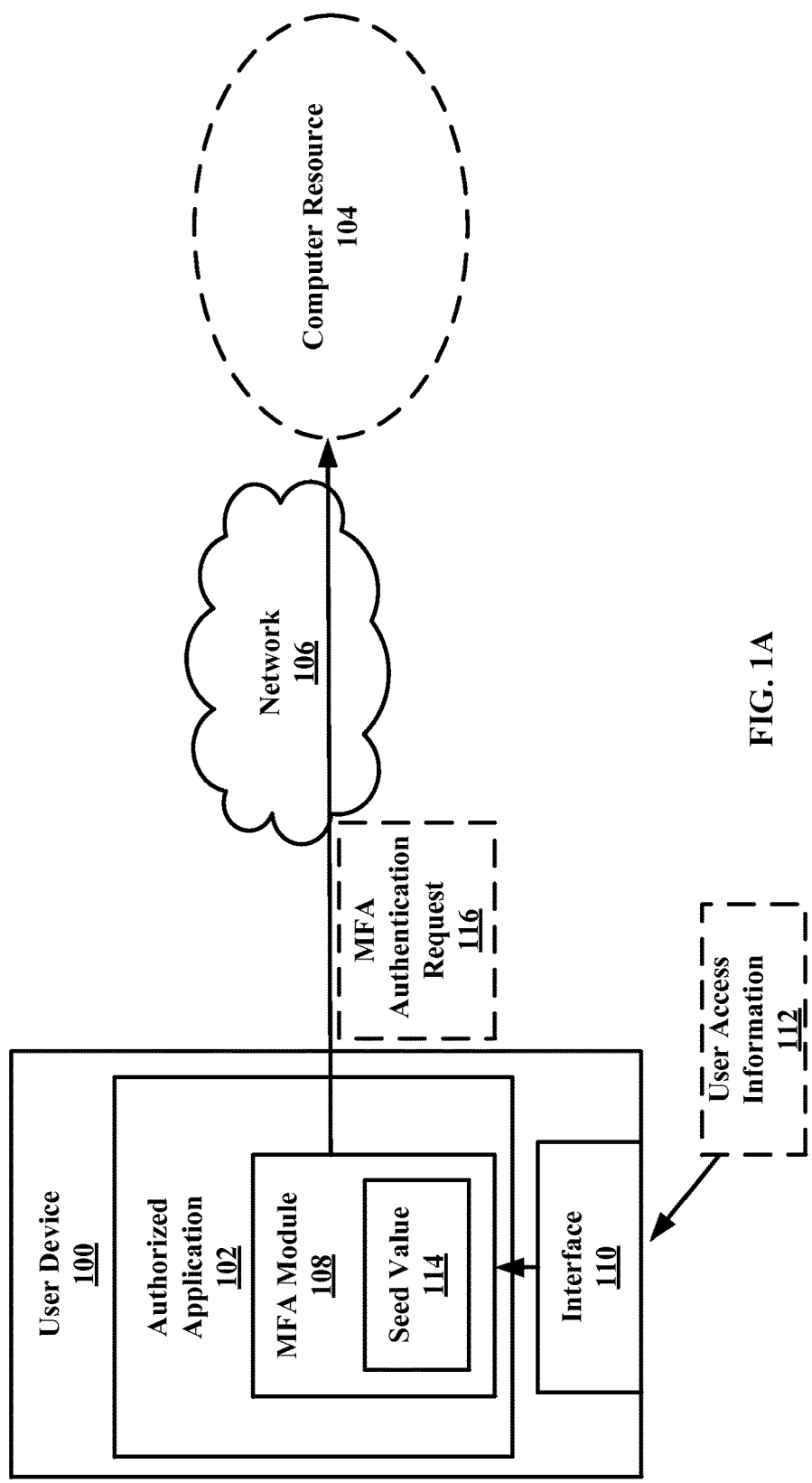
FIGS. 1A and 1B illustrate an example of a multifactor authentication system, according to various implementations.
Figure 1B:
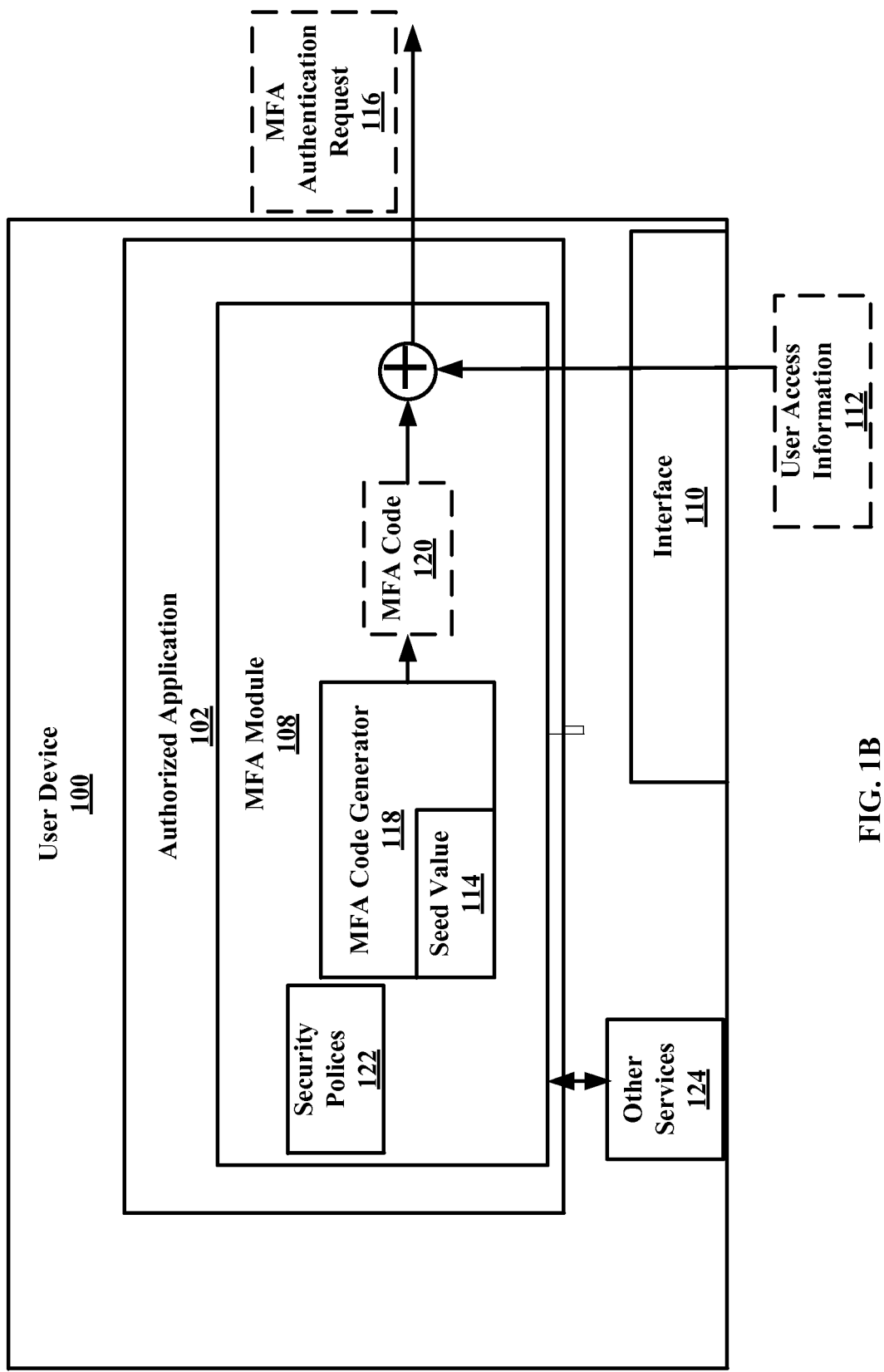

FIGS. 1A and 1B illustrates an example of a user device 100, which includes an authorized application 102 that can be used to securely access a computer resource 104, according to various implementations. While FIGS. 1A and 1B illustrate various components contained in the user device 100 and the authorized application 102, FIGS. 1A and 1B illustrate one example and additional components can be added and existing components can be removed.

In implementations, the authorized application 102 can be configured to allow a user of the user device 100 to securely access the computer resource 104. The authorized application 102 can be any type of software application or program that can be utilized to communicate with the computer resource 104. For example, the authorized application 102 can be a console application used to access a web service.

The authorized application 102 can be configured to establish communications, via a network 106, with the computer resource 104 utilizing multifactor authentication. Multifactor authentication is an authentication protocol which requires the presentation of two or more authentication factors such as: a knowledge factor ("something the user knows"), a possession factor ("something the user has"), and an inherence factor ("something the user is"). The authorized application 102 can be configured to establish communications with the computer resource 104 utilizing the knowledge factor and the possession factor. To improve the authentication process, the authorized application 102 can be configured to automatically perform the possession factor process of multifactor authentication.

The user device 100 can include computer devices, such as desktops, laptops, servers, etc., or mobile devices, such as smart telephones, tablet computers, cellular telephones, personal digital assistants, etc. The user device 100 can include hardware resources (e.g., processors, memory, storage, network interface, I/O devices, etc.) and software resource (e.g., operating systems, application programs, mobile apps, etc.) that are found in conventional computer devices. The user device 100 can also store and execute the authorized application 102 that is configured to perform the multifactor authentication as described herein.

The computer resource 104 can be any type of computer system or computer systems that can be accessed by the user device 100. The computer resource 104 can include one or more server computers that contain content (e.g. web pages, media, applications, etc.) accessible by the user device 100. Likewise, the computer resource 104 can include a computer resource service, for example, a web service. A computer resource service can be configured to deliver computing resources to the user device 100, over the network 106, as a service. A computer resource service can include a number of computer systems from which the user device 100 can provision computing resources on a pay-per-use basis, such as on an hourly basis. To provide computer resources as a service, a computer resource service can be configured to execute one or more machine instances (MIs) on one or more of the computer systems.

A MI can correspond to one or more computer systems or a virtual machine (VM) hosted by one or more computer systems. A VM can be a virtualized computer system, or a software implementation of a computer system layered on top of one or more computer systems. The VM's access to the underlying computer system can be controlled through a hypervisor or virtual machine monitor. The VMs can provide for multiple and/or different operating system environments to run concurrently on a single computer system. In a computer resource service, each MI can be controlled by different users, for example, using the authorized application 102, who can have administrative access only to their own MIs and no access to the instances of other users. Multiple MIs can execute concurrently on a computer system including parallel processors, although multiple instances can appear to execute concurrently on a multithreaded computer system with fewer processors than instances. In some cases, different MIs, which execute on a computer system, are controlled by two or more different users, while in other cases all of the MIs are controlled by a single user.

In implementations, the authorized application 102 can provide an interface for communicating with the computer resource 104. The authorized application 102 can be configured as a software program that is capable of being stored on and executed by the user device 100. Likewise, the authorized application 102 can be configured as a software module that is part of other software programs stored on and executed by the user device 100. In any example, the authorized application 102 can be written in a variety of programming languages, such as JAVA, C++, Python code, Visual Basic, HTML, XML, and the like to accommodate a variety of operating systems, computer system architectures, etc. As illustrated in FIG. 1A, the authorized application 102 can include a multifactor authentication (MFA) module 108. While illustrated as being part of a single application program, any one of the components of the authorized application 102 can be implemented as a separate software programs or modules.

In implementations, the authorized application 102 can be configured to perform the multifactor authentication to allow the user device 100 to access the computer resource 104. The authorized application 102 can be configured to interact with a user to acquire the knowledge factor ("something the user knows"). The authorized application 102 can be configured to provide an interface 110 to allow the user to input user access information 112. The user access information 112 can be any type of information that is used to access the computer resource 104. For example, the user access information 112 can include a user name, password, or both. The interface 110 can be any type of interface that allows a user to communicate with the authorized application 102. For example, the interface 110 can include a graphical user interface ("GUI") or command-line interface that is displayed on a display of the user device 100 and that allows a user to interact with the authorized application 102.

In implementations, the authorized application 102, communicating with the MFA module 108, can be configured to automatically perform, without user interaction, the possession factor ("something the user has") process of the multifactor authentication. To achieve this, the MFA module 108 can be configured to maintain a seed value 114. The seed value 114 can be a secret that is shared by the MFA module 108 and the computer resource 104. The MFA module 108 can be configured to utilize the seed value 114 to generate a MFA code that can be verified by the computer resource 104 using the shared seed value 114. Likewise, the authorized application 102 can be configured to obtain the MFA code or the seed value 114 from the MFA module 108 in order to perform the multifactor authentication.

For example, the seed value 114 can be a cryptographic key that is shared by the MFA module 108 and the computer resource 104. In this example, the MFA module 108 can be configured to generate a cryptographic challenge using the cryptographic key, which can be verified by the computer resource 104. Likewise, for example, the seed value 114 can be a seed value that is used to generate a random number as the MFA code. For example, the random number can be based on the seed value 114 shared by the MFA module 108 and the computer resource 104 and another factor such as a time value.

In implementations, the MFA module 108 can be configured to securely maintain the seed value 114. For example, the MFA module 108 can be configured to encrypt the seed value 114 when stored in the memory of the user device 100. Likewise, for example, the MFA module 108 can be configured to store the seed value 114 in a secure memory that is only accessible by the MFA module 108 (or other authorized components). For example, the MFA module 108 can store the seed value 114 in a trusted platform module (TPM) security device.

In implementations, the MFA module 108 can be configured to obtain the seed value 114 from the computer resource 104 or other security system. The MFA module 108 can be configured to obtain the seed value 114 utilizing any type of method or procedure, such as request-challenge, bootstrapping methods, shared secret, etc., as described below.

Once the user access information 114 and the MFA code has been acquired, the authorized application 102 can be configured to generate a MFA authentication request 116. The MFA authentication request 116 can include a portion of the user access information 114 (e.g. user name, password, or both), the MFA code generated by the MFA module 108, and any other information necessary for authentication. The authorized application 102 can be configured to transmit the MFA authentication 116 request to the computer resource 104, via the network 106, for verification.

FIG. 1B illustrates a more detailed example of the MFA module 108. As illustrated in FIG. 1B, the MFA module 108 can include a MFA code generator 118. The MFA code generator 118 can be configured to include the necessary logic, algorithms, processes, etc. to generate the MFA code 120 based on the seed value 114. Likewise, the MFA code generator 118 can be configured to provide the seed value 114 to the authorized application 102 upon request.

In implementations, the MFA code generator 118 can utilize any type of procedure, protocol, algorithm, etc. to generate the MFA code. For example, MFA code generator 118 can utilize conventional standards to generate the MFA code 120, such as Initiative For Open Authentication (OATH) standards HOTP or TOTP, time-based one time password standards, a S/KEY standards, etc. The MFA code generator 118 can be configured to generate the MFA code 120 on-demand, continuously, or both. For example, the MFA code generator 118 can be configured to generate the MFA code 120 once a request is received from the authorized application 102. Likewise, for example, the MFA code generator 118 can be configured to generate the MFA code 120 at predefined intervals or times. Once a request is received from the authorized application 102, the MFA code generator 118 can provide the current MFA code 120 to the authorized application 102.

Once the MFA code 120 is generated by the MFA module 108, the MFA code 120 can be combined with a portion of the user access information 112 (and any other necessary information for authentication) to form the MFA authentication request 116. In implementations, the MFA authentication request 116 can include the MFA code 120 and the user access information 112 (e.g. user name, password, or both). Likewise, in implementations, the MFA module 108 can generate a signature to be included in the authentication request 116. The signature can be generated based on the MFA code 120, the access information 112, and combinations thereof. The MFA module 108 can utilize any type of procedure, protocol, algorithm, etc. to generate the signature. For example, MFA module 108 can utilize conventional asymmetric algorithms (e.g., keyed-hash message authentication code (HMAC)) or symmetric algorithms (e.g., cipher block chaining message authentication code (CBC-MAC)) to generate the signature.

The MFA authentication request 116 can then be transferred to the computer resource 104 for authentication. While FIG. 1B illustrates the MFA module 108 generating the MFA authentication request 116, the authorized application 102 can be configured to receive the MFA code 120 from the MFA module 108 and generate the MFA authentication request 116.

In implementations, the MFA module 108 (or the authorized application 102) can be configured to enforce one or more additional security polices 122. The security polices 122 can include location-based security polices, time-based security policies, attempt-based security polices, device fingerprinting security policies, and the like. To achieve this, the MFA module 108 (or the authorized application 102) can be configured to communicate with other services 124 of the user device 100. The other services 124 can include, for example, location determination hardware and software of the user device 100, timing hardware and software of the user device 100, identification information of the user device 100, and the like.

Figure 2:
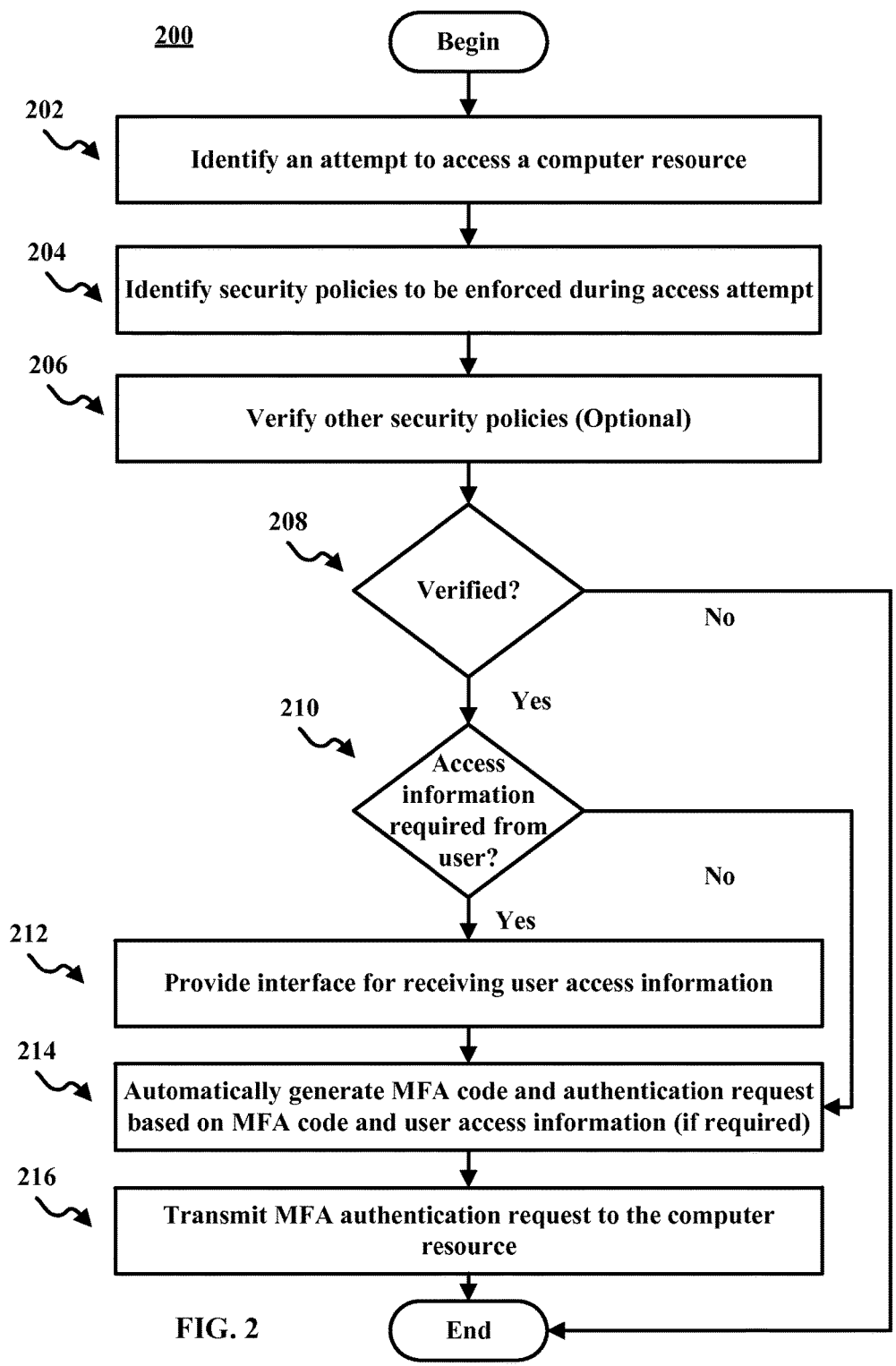
FIG. 2 illustrates an example of a process for multifactor authentication, according to various implementations.

FIG. 2 illustrates a process 200 for performing multifactor authentication, according to various implementations. In the process 200, the illustrated stages are examples and any of the illustrated stages can be removed, additional stages can be added, and the order of the illustrated stages can be changed. Additionally, while the process 200 is described as being performed by the authorized application 102 or the MFA module 108, one or more of the stages of the process 200 can be performed by any hardware or software component.

In 202, the authorized application 102 can identify an attempt to access the computer resource 104. For example, a user of the user device 100 can initiate the authorized application 102. In response, the authorized application 102 can provide the interface 110 to the user for receiving the user access information 112. In some examples, each time authentication is initiated, the authorized application 102 can request entry of the user access information 112. In some examples, the authorized application 102 can receive the user access information 112 and store the user access information 112 for future use.

In 204, the authorized application 102 can identify security policies to be enforced during the access attempt. The security policies can include a requirement that the user provide access information. For example, the requirement to provide the access information can be based whether the authorized application 102 has previously received and stored the access information, the location of the user device 100, the time of day of the access attempt, the number of times an access attempt has occurred, fingerprint of the user device 100, and combination thereof. Additionally, the security policies can include other security polices that allow or deny access attempts completely based on various factors. For example, the security polices 122 can include location-based security polices, time-based security policies, attempt-based security polices, device fingerprinting security policies, and the like.

In 206, the authorized application 102 can optionally verify other security policies 122. For example, the security polices 122 can include location-based security polices, time-based security policies, attempt-based security polices, device fingerprinting security policies, and the like. If other security policies 122 are applicable, the authorized application 102 can acquire any necessary information to perform the verification from the other services 124.

In 208, if not verified, the authorized application 102 can end the authentication process and provide notification to the user. If verified, in 208, the authorized application 102 can proceed to 210. In 210, the authorized application 102 can determine if access information is required from the user. If access information is not required, the authorized application 102 can proceed to 214. For example, the security policies may not require the user to enter access information. For instance, the user may have previously provided the access information which can be stored by the authorized application 102. Likewise, for instance, the authorized application 102 may not require the access information be included in the authentication request. Also, for instance, the conditions of the attempted access, e.g. time of day, location of the user device 100, number of access attempts, fingerprint of the user device 100, may not require the entry of the access information.

In 210, if the access information is required, the authorized application 102 can proceed to 212. In 212, the authorized application can provide an interface that allows the user to enter the access information. For example, the authorized application 102 can generate and display a graphical user interface for the user to enter the access information. The access information can include, for example, an identifier (e.g. user name), a user secret (e.g. password), and the like.

In 214 the authorized application 102 can automatically generate the MFA code 120 and generate the authentication request 116 based on MFA code 120 and user access information 112 (if required). The MFA code can be generated based on the seed value 114. For example, the authorized application 102 can request that the MFA module 108 provide the MFA code 120. In response, the MFA code generator 118 can generate the MFA code 120 and provide the code to the authorized application 102. In some examples, if the MFA code generator 118 is continuously generating MFA codes, the MFA code generator 118 can select and provide the current MFA code 120 to the authorized application 102. In some examples, the MFA module 108 can provide the seed value 114 to the authorized application 102, and the authorized application 102 can generate the MFA code 120.

Additionally, the authorized application 102 can automatically generate the authentication request 116 using the MFA code 120. The authentication request 116 can be generated from the MFA code 120 and any other information required in the authentication request. For example, the authorized application 102 can combine the MFA code 120, a portion of the user access information 112, and any other necessary information into a message to be sent to the computer resource 104. The authorized application 102 can generate the MFA authentication request 116 in any format that is applicable to the computer resource 104. For example, if the computer resource 104 is a computer resource service using a web services application programming interface (API), the authorized application 102 can format the MFA authentication request 116 according to an extensible markup language (XML) format.

In 216, the authorized application can transmit MFA authentication request 116 to the computer resource 104. The authorized application 102 can utilize any network protocol applicable to the computer resource 104 to transmit the MFA authentication request 116. For example, if the computer resource 104 is a log-in web page for a web service, the authorized application 102 can transmit the MFA authentication request 116 using an appropriate network based protocol.

After 216, the process can end, repeat, or return to any point.

In the process described above, the authorized application 102 can receive the user access information 112 and include the user access information in the MFA authentication request 116. In some examples, the authorized application 102 can be configured to verify the user access information 112 before generating the MFA authentication request 116

Figure 3A:
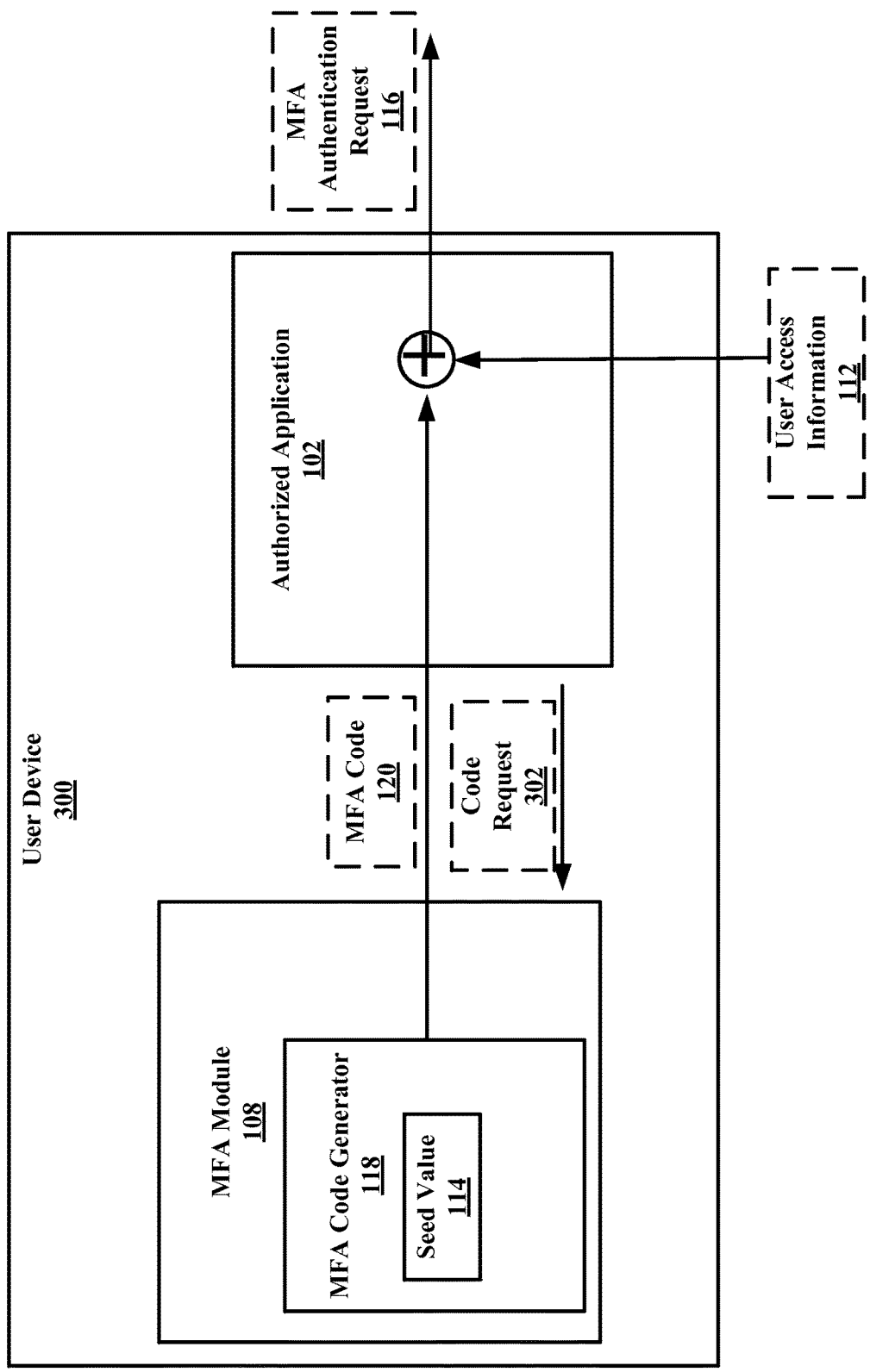
FIGS. 3A and 3B illustrate another example of multifactor authentication system, according to various implementations.
Figure 3B:
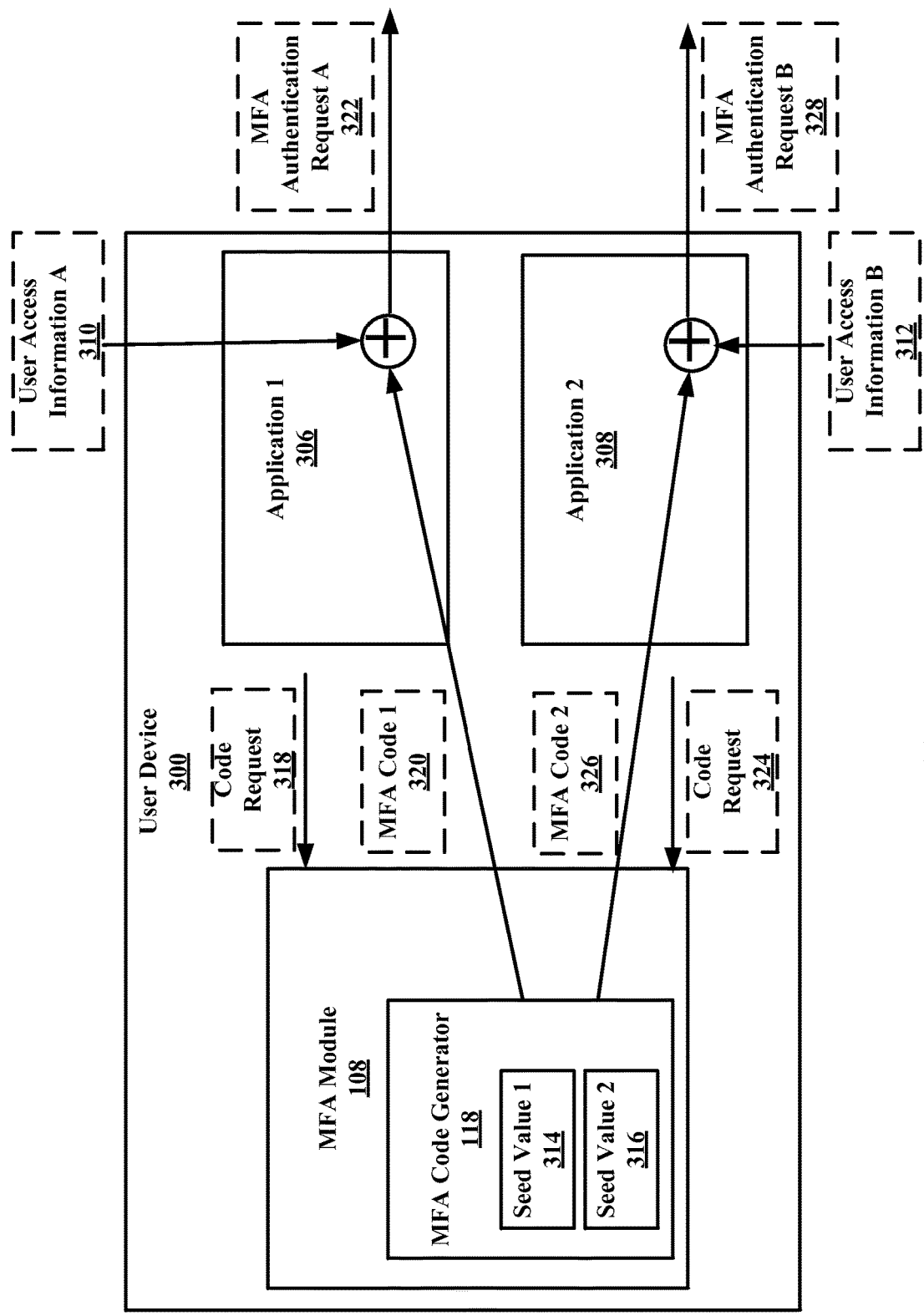

As described above, the MFA module 108 can be a component of the authorized application 102. In implementations, the MFA module 108 can be implemented as a component separate from the authorized application 102. FIGS. 3A and 3B illustrate an example of a user device 500 which includes a separate MFA module 108, according to various implementations. While FIGS. 3A and 3B illustrate various components contained in the user device 300, FIGS. 3A and 3B illustrate one example and additional components can be added and existing components can be removed.

As illustrated in FIG. 3A, the MFA module 108 can be implemented as a component separate from the authorized application 102. When obtaining an MFA code 120 as described above in FIG. 2, the authorized application 102 can be configured to provide a code request 302 to the MFA module 108. In response, the MFA module 108 can be configured to generate the MFA code 120 based on the seed value 114. The MFA module 108 can be configured to return the MFA code 120 to the authorized application 102. Likewise, in response to a code request 302, the MFA module 108 can return the seed value 114 to the authorized application 102. In this example, the authorized application 102 can generate the MFA code based on the seed value 114.

In implementations, the MFA module 108 can be implemented as hardware, software, or combination of both. For example, the MFA module 108 can be implemented as a secure hardware component of the user device 108, such as a TPM security device. In this example, the MFA module 108 can include a combination of hardware and software that is configured to securely store the seed value 114 and generate the MFA code 120. The secure hardware component can be integrated in or removable from the user device 300.

Also, for example, the MFA module 108 can be configured as a software program that is capable of being stored on and executed by the user device 300. Likewise, the MFA module 108 can be configured as a software module that is part of other software programs stored on and executed by the user device 300. In any example, the MFA module 108 can be written in a variety of programming languages, such as JAVA, C++, Python code, Visual Basic, HTML, XML, and the like to accommodate a variety of operating systems, computer system architectures, etc. In these examples, the MFA module 108 can be configured to provide an API that allows the authorized application 102 to request the MFA code 120 or the seed value 114.

Also, for example, the MFA module 108 can be implemented as a software component that is accessible by the authorized application 102. For instance, the MFA module 108 can be implemented as a software library that is accessible by the authorized application 102. In this example, the MFA module 108 can be implemented as a software library that is included in another software program stored on the user device 300, such as the operating system of the user device 300.

In addition to providing the MFA code 120 or seed value 114 to the authorized application 102, the MFA module 108 can be configured to support multifactor authentication for multiple applications. As illustrated in FIG. 3B, the user device 300 can include an application 1 306 and an application 2 308, which utilize user access information A 310 and user access information B 312, respectively. To support the multifactor authentication for the application 1 306 and the application 2 308, the MFA module 108 can be configured to maintain a seed value 1 314 corresponding to the application 1 306 and seed value 2 316 corresponding the application 2 308.

During authentication, the application 1 306 can provide a code request 318 to the MFA module 108. In response, the MFA module 314 can identify the seed value 1 314 corresponding to the application 1 306. The MFA module 108 can provide an MFA code 1 320 generated based on the seed value 1 314 to the application 1 306. The application 1 306 can then generate the MFA authentication request A 322. In this example, the MFA module 108 can provide the seed value 1 314 to the application 1 306, and the application 1 306 can generate the MFA code 320.

Likewise, during authentication, the application 2 308 can provide a code request 324 to the MFA module 108. In response, the MFA module 108 can identify the seed value 2 316 corresponding to the application 2 308. The MFA module 108 can provide an MFA code 2 324 generated based on the seed value 2 316 to the application 2 308. The application 2 308 can then generate the MFA authentication request A 328. In this example, the MFA module 108 can provide the seed value 1 316 to the application 2 308, and the application 2 308 can generate the MFA code 324.

In the example illustrated in FIGS. 3A and 3B, the authorized application 102 (or the MFA module 108) can be configured to perform other processes described above. For example, the authorized application 102 (or the MFA module 108) can be configured to verify the other security polices 122. Likewise, the authorized application 102 (or the MFA module 108) can be configured to verify the user access information 112.

Figure 4:
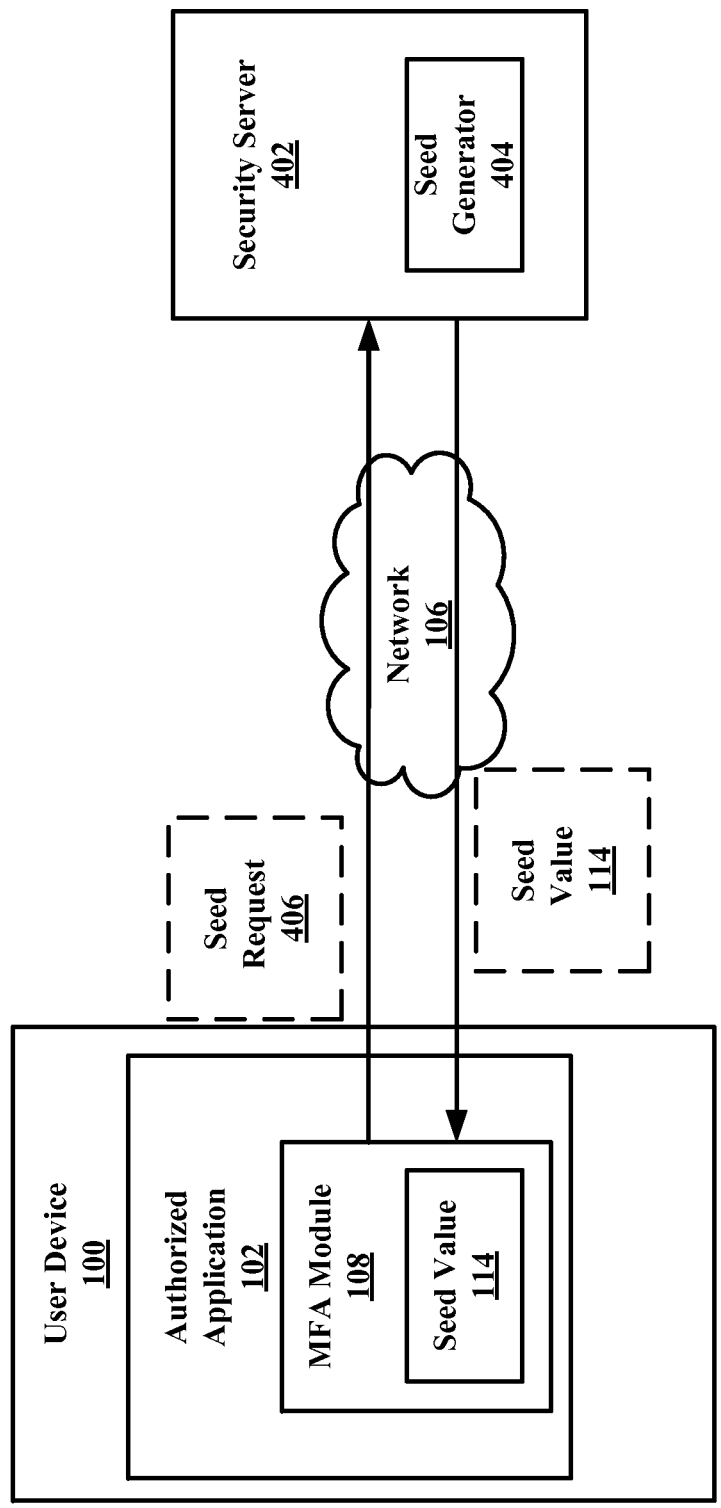
FIG. 4 illustrates an example of a system for obtaining a seed value, according to various implementations.
Figure 5:
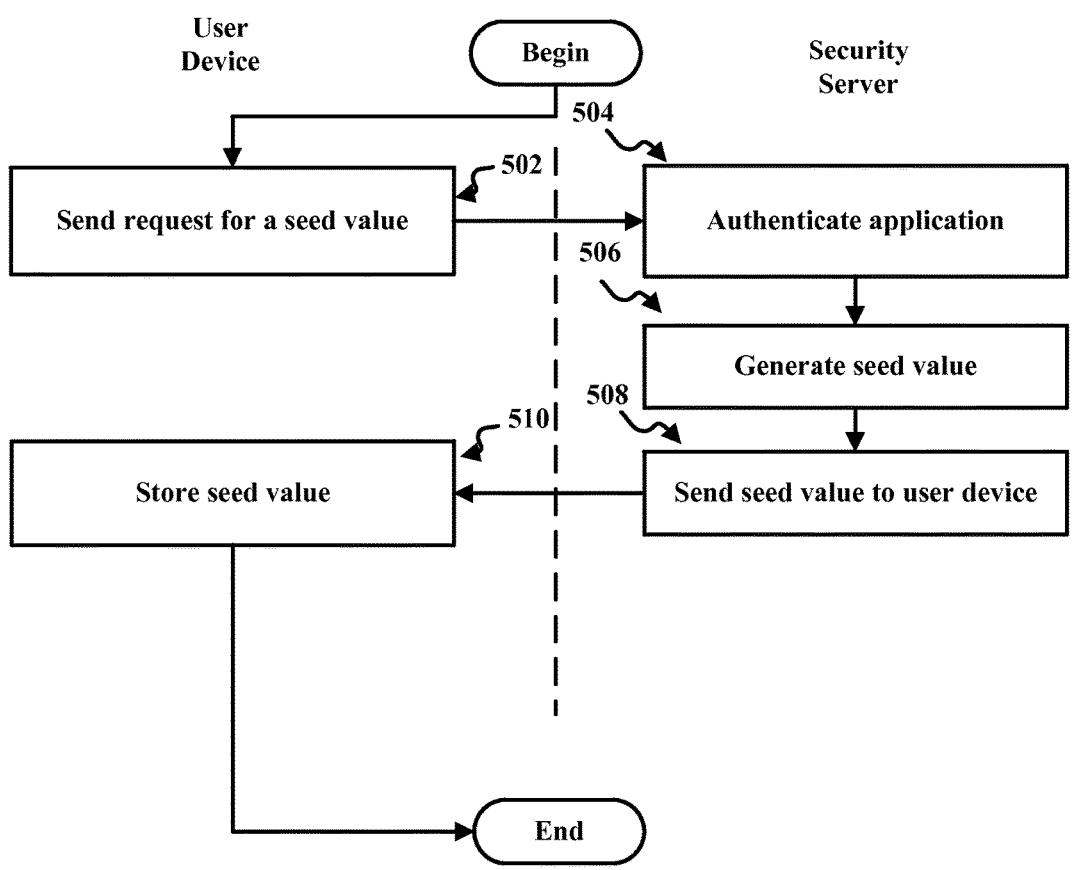
FIG. 5 illustrates an example of a process for obtaining a seed value, according to various implementations.

As described above, the authorized application 102 or the MFA module 108 can be configured to obtain the seed value 114 from the computer resource 104 or other security system using various types of procedures and protocols, such as challenge-response methods, bootstrapping methods, key exchange methods, etc. FIGS. 4 and 5 illustrate one example of obtaining a seed value, according to various implementations. While FIG. 4 illustrates various components contained in the user device 100 and the security server 402, FIG. 4 illustrates one example and additional components can be added and existing components can be removed.

As illustrated in FIG. 4, the user device 100 can communicate with a security server 402 to obtain the seed value 114. The security server 402 can be a component in the computer resource 104. Likewise, the security server 402 can be separate from the computer resource 104. The security server 402 can include a seed generator 404 for generating the seed value 114.

In implementations, the authorized application 102 (or the MFA module 108) can be configured to transmit a seed request 406 to the security server 402, via the network 106. The seed request 406 can include information that allows the security server 402 verify that the authorized application 102 (or the MFA module 108) is authorized to receive the seed value 114. For example, the seed request 406 can include an identification of the authorized application 102, an identification of the MFA module 108, the user access information 112, and the like. The security server 402 can verify that the authorized application 102 (or the MFA module 108) is authorized to receive the seed value 114. If authorized, the security server 402 can generate the seed value 114 and transmit the seed value 114 to the authorized application 102 (or the MFA module 108).

FIG. 5 illustrates a process 500 for obtaining a seed value, according to various implementations. In the process 500, the illustrated stages are examples and any of the illustrated stages can be removed, additional stages can be added, and the order of the illustrated stages can be changed. Additionally, while the process 500 is described as being performed by the authorized application 102, one or more of the stages of the process 200 can be performed by any hardware or software component, such as the MFA module 108.

In 502, the authorized application 102 can send a request for a seed value to the security server 402. The request can be generated in a format that is accessible by the security server 402 and can be transmitted to the security server 402 by a protocol associated with the security server. The seed request 406 can include information that allows the security server 402 to verify that the authorized application 102 (or the MFA module 108) is authorized to receive the seed value 114. For example, the seed request 406 can include an identification of the authorized application 102, an identification of the MFA module 108, the user access information 112, and the like. In some examples, the seed request 406 can include authentication information obtained by the authorized application 102. For instance, the authorized application 102 can obtain authentication information from a secondary source, such as a quick response (QR) code, other computer devices, etc., to include in the seed request 406.

In some examples, the request for a seed value can be the first access attempt by the authorized application 102. In this example, the authorized application 102 can request access to the computer resource 104 without include a MFA authentication request. The computer service 104 can recognize that this is the first attempt at access and initiate authenticating the authorized application 102 in order to provide the seed value 114.

In 504, in response to receiving the request, the security server 504 can authenticate the authorized application 102. For example, the security server 402 can utilize the information in the request to authenticate the authorized application 102.

In some examples, when the authorized application 102 attempt first access, the security server 402 can transmit a challenge back to the authorized application 102. The challenge can be any type of protocol that can verify the authorized application 102, for example, a CAPTCHA ("Completely Automated Public Turing test to tell Computers and Humans Apart") code. The challenge can be transmitted in any format using any protocol, such as a text message, email message, etc. If the authorized application 102 correctly replies to the challenge, the security server 402 can determine that the authorized application 102 is authentic.

In 506, if the authorized application 102 is authenticated, the security server 402 can generate the seed value 114. In 508, the security server 402 can transmit the seed value 114 to the authorized application 102. In 510, the authorized application 102 can store the seed value 114.

After 506, the process can end, repeat, or return to any point.

In implementations, the authorized application 102 can utilize other procedures and protocols to obtain the seed value. For example, the authorized console application 102 can generate the seed value 114 and provide the seed value 114 to the security server 402. Likewise, for example, the authorized application 102 and security server 402 can utilize cooperative key agreement protocols to establish the seed value 114. For example, the authorized application 102 and the security server 402 can utilize key agreement protocols such as Diffie-Hellman key exchange, elliptic curve Diffie-Hellman key exchange, password authenticated key agreement protocols (e.g., encrypted key exchange, Diffie-Hellman encrypted key exchange, simple password exponential key exchange, secure remote password protocol, etc.), authenticated key exchange protocols (e.g., Menezes-Qu-Vanstone protocol, elliptic curve Menezes-Qu-Vanstone protocol, YAK protocol, Internet Security Association and Key Management Protocol, etc.) Interlock Protocol, and the like.

Figure 6:
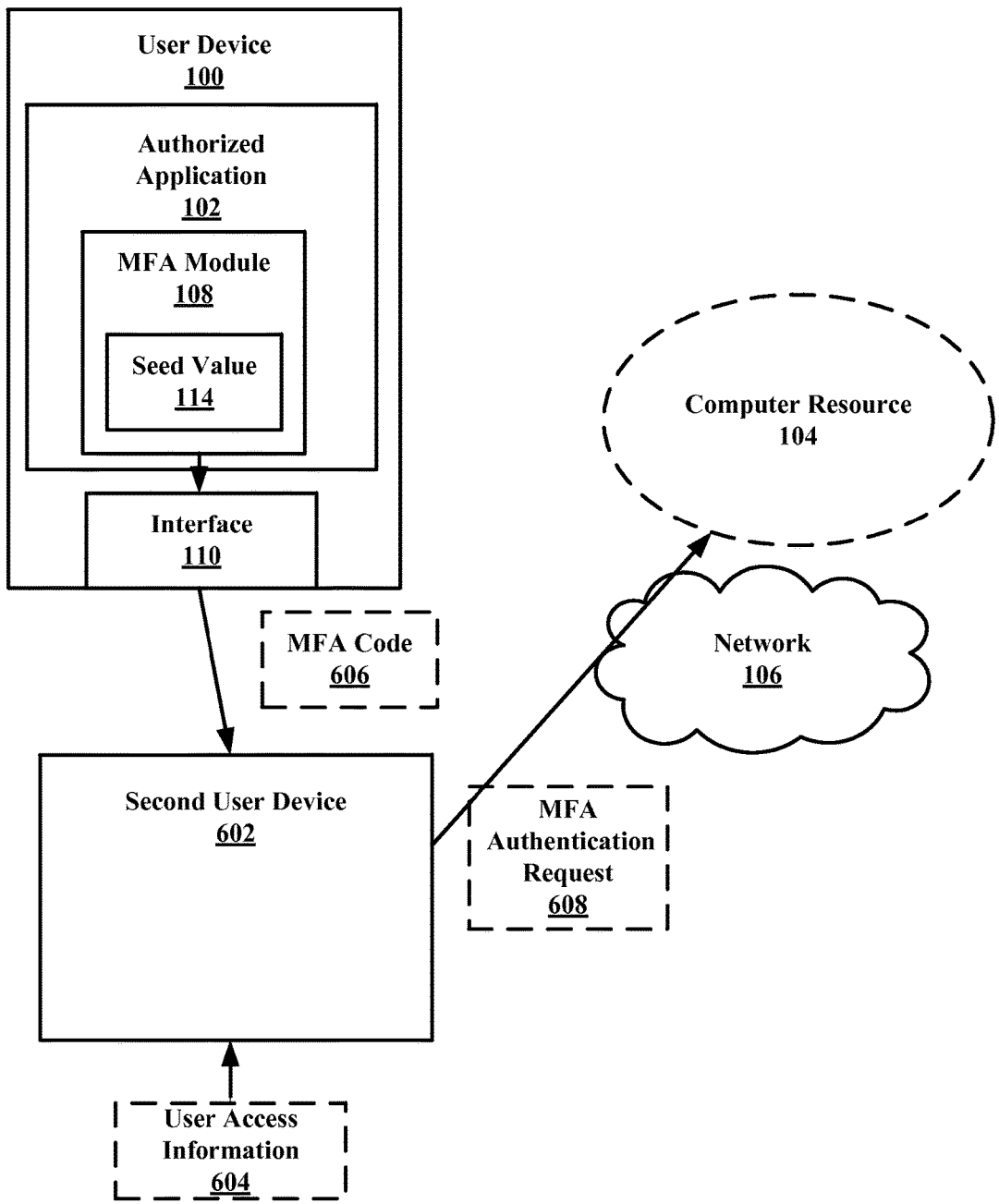
FIG. 6 illustrates another example of multifactor authentication system, according to various implementations.

In addition to providing multifactor authentication from the user device 100, the authorized application 102 can be configured to assist in multifactor authentication on other computer devices. FIG. 6 illustrates an example of the user device 100 assisting in multifactor authentication from a second user device 602, according to various implementations. While FIG. 6 illustrate various components contained in the user device 100 and the second user device 602, FIG. 6 illustrates one example and additional components can be added and existing components can be removed.

As illustrated in FIG. 6, a user may desire to access the computer service 104 from the second user device 602. The second user device 602 can include computer devices, such as desktops, laptops, servers, etc., or mobile devices, such as smart telephones, tablet computers, cellular telephones, personal digital assistants, etc. The second user device 602 can include hardware resources (e.g., processors, memory, storage, network interface, I/O devices, etc.) and software resource (e.g., operating systems, application programs, mobile apps, etc.) that are found in conventional computer devices. The second user device 602 can include an application for accessing the computer resource 104.

To gain access, the second user device 602 can receive user access information 604 from the user. Because the second user device does not include the authorized application 102, the second user device 602 may not be capable of completing the multifactor authentication. In this case, the user can utilize the user device 100, containing the authorized application 102, in the multifactor authentication. In particular, the authorized application 102 (or the MFA module 108) can generate the MFA code 606 and provide the MFA code 606 to the second user device 602. Once received, the second user computer device 602 can generate a MFA authentication request 608 and provide the MFA authentication request 608 to the computer resource 104.

In implementations, the authorized application 102 (or the MFA module 108) can be prompted to generate and provide the MFA code 606 by a variety of processes. For example, the user can initiate the authorized application 102 and request that the authorized application 102 provide the MFA code 606. Likewise, for example, the second user computer device 100 can communicate directly with the authorized application 102 (or the MFA module 108) to prompt the authorized application 102 (or the MFA module 108) to generate the MFA code 606. Also, for example, the second user device 602 can request access to the computer resource 104, and the computer resource 104 can prompt authorized application 102 (or the MFA module 108) to provide the MFA code 606.

In implementations, the authorized application 102 (or the MFA module 108) can provide the MFA code 606 to the second user device 602 by a variety of process. For example, the authorized application 102 (or the MFA module 108) can display the MFA code 606, via the interface 110, and the user can input the MFA code 606 into the second user device 602.

Likewise, for example, the authorized application 102 (or the MFA module 108) can provide the MFA code 606 directly to the second user device 602. The authorized application 102 (or the MFA module 108) can provide the MFA code 606 directly utilizing a variety of formats and communication channels. For instance, the authorized application 102 (or the MFA module 108) can provide the MFA code 606, via the network 106, in a message, such as an email message, a text message, and the like. Also, for instance, the authorized application 102 (or the MFA module 108) can provide the MFA code 606 utilizing other communication channels such as BLUETOOTH, near field communications (NFC), and the like. Also, the authorized application 102 (or the MFA module 108) can provide the MFA code 606 directly to the computer resource 104 using any of the above communication processes.

Figure 7:
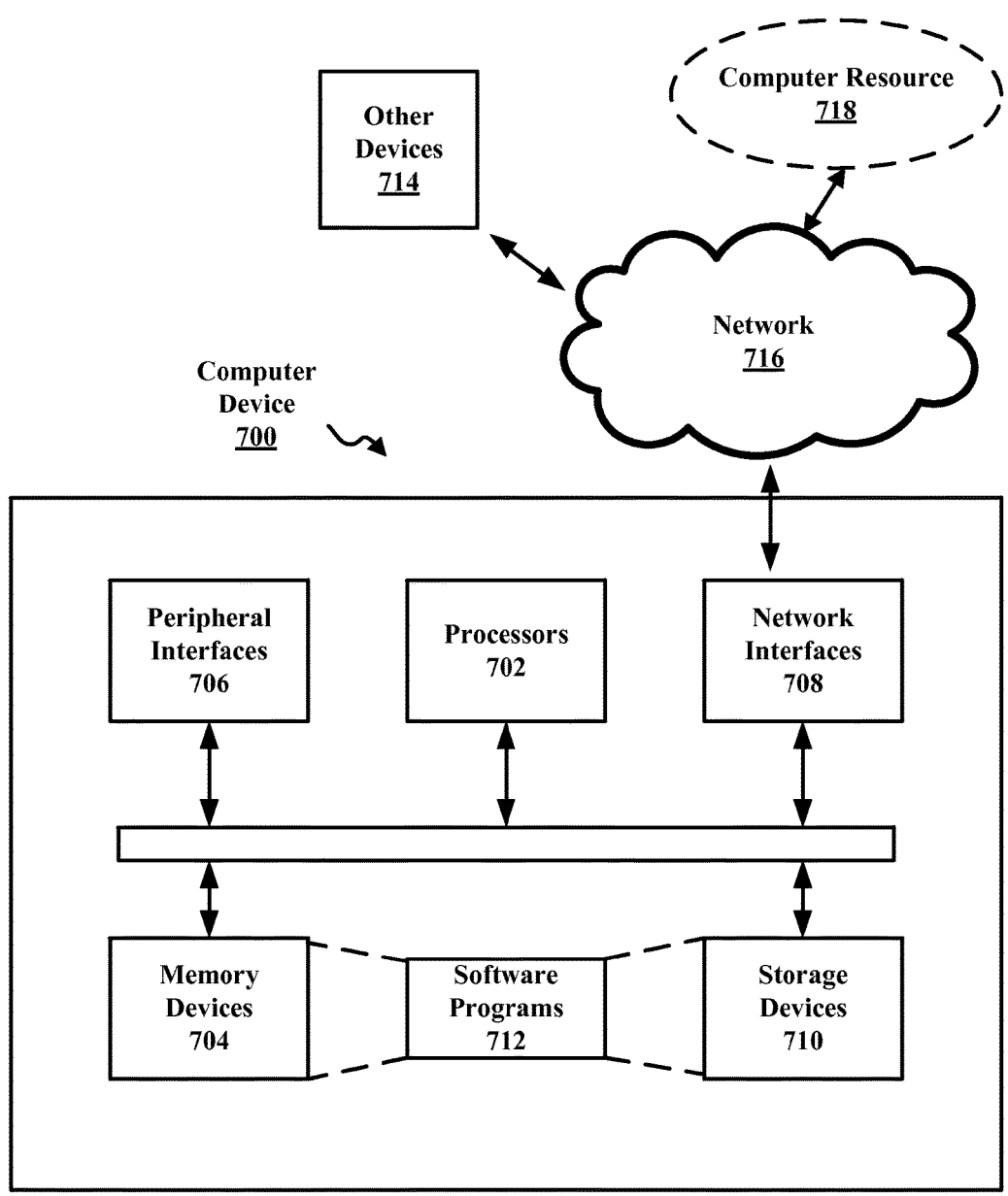
FIG. 7 illustrates an example of a hardware configuration of a computer device, according to various implementations.

FIG. 7 illustrates an example of a hardware configuration for a computer device 700, such as user device 100, that can be used to perform one or more of the processes described above. While FIG. 7 illustrates various components contained in the computer device 700, FIG. 7 illustrates one example of a computer device and additional components can be added and existing components can be removed.

The computer device 700 can be any type of computer devices, such as desktops, laptops, servers, etc., or mobile devices, such as smart telephones, tablet computers, cellular telephones, personal digital assistants, etc. As illustrated in FIG. 7, the computer device 700 can include one or more processors 702 of varying core configurations and clock frequencies. The computer device 700 can also include one or more memory devices 704 that serve as a main memory during the operation of the computer device 700. For example, during operation, a copy of the resource monitoring tool 100 can be stored in the one or more memory devices 704. The computer device 700 can also include one or more peripheral interfaces 706, such as keyboards, mice, touchpads, computer screens, touchscreens, etc., for enabling human interaction with and manipulation of the computer device 700.

The computer device 700 can also include one or more network interfaces 708 for communicating via one or more networks, such as Ethernet adapters, wireless transceivers, or serial network components, for communicating over wired or wireless media using protocols. The computer device 700 can also include one or more storage device 710 of varying physical dimensions and storage capacities, such as flash drives, hard drives, random access memory, etc., for storing data, such as images, files, and program instructions for execution by the one or more processors 702.

Additionally, the computer device 700 can include one or more software programs 712, such as the authorized console module 102 and the MFA module 108. The one or more software programs 712 can include instructions that cause the one or more processors 702 to perform the processes described herein. Copies of the one or more software programs 712 can be stored in the one or more memory devices 704 and/or on in the one or more storage devices 710. Likewise, the data, for example, the seed value 114, utilized by one or more software programs 712 can be stored in the one or more memory devices 704 and/or on in the one or more storage devices 710.

In implementations, the computer device 700 can communicate with one or more remote user devices 714 and the computer resource 718 via a network 716. The one or more remote user devices 714 can be any types of conventional computer devices. For example, the one or more user devices 714 can be desktops, laptops, servers, etc., or mobile devices, such as smart telephones, tablet computers, cellular telephones, personal digital assistants, etc. The network 716 can be any type of network, such as a local area network, a wide-area network, a virtual private network, the Internet, an intranet, an extranet, a public switched telephone network, an infrared network, a wireless network, and any combination thereof. The network 716 can support communications using any of a variety of commercially-available protocols, such as TCP/IP, OSI, FTP, UPnP, NFS, CIFS, and AppleTalk. The network 716 can be, for example, a local area network, a wide-area network, a virtual private network, the Internet, an intranet, an extranet, a public switched telephone network, an infrared network, a wireless network, and any combination thereof.

In implementations, the computer device 700 can exchange data with the one or more user devices 714 and the computer resource 718 over the network 716. For example, the computer device 700 can provide the MFA authentication request 116 to the computer resource 718.

The computer resource 718 can be implemented as part of at least one service or Web service, such as may be part of a service-oriented architecture. As described above, the computer resource 718 can implement an interface, for example, a Web Services API. The computer device 700 can exchange data with the computer resource 718, via the Web Services API, during operation of the at least one service or Web service. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

In implementations, the computer resource 718 can be utilized as part of a Web server architecture. In the Web server architecture, the computer resource 718 can run any of a variety of server or mid-tier applications, including HTTP servers, FTP servers, CGI servers, data servers, Java servers, and business application servers. The computer resource 718 also can be capable of executing programs or scripts in response requests from the computer device 700, such as by executing one or more Web applications that may be implemented as one or more scripts or programs written in any programming language, such as Java®, C, C# or C++, or any scripting language, such as Perl, Python, or TCL, as well as combinations thereof. The computer resource 718 can also include database servers, including without limitation those commercially available from Oracle®, Microsoft®, Sybase®, and IBM®.

The computer device 700 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 700 as described above need not be enclosed within a single enclosure or even located in close proximity to one another. Those skilled in the art will appreciate that the above-described componentry are examples only, as the computer device 700 can include any type of hardware componentry, including any necessary accompanying firmware or software, for performing the disclosed implementations. The computer device 700 can also be implemented in part or in whole by electronic circuit components or processors, such as application-specific integrated circuits (ASICs) or field-programmable gate arrays (FPGAs).

Certain implementations described above can be performed as a computer applications or programs. The computer program can exist in a variety of forms both active and inactive. For example, the computer program can exist as one or more software programs, software modules, or both that can be comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Examples of computer readable storage devices and media include conventional computer system RAM (random access memory), ROM (read-only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection may be through a direct connection, or through an indirect connection via other devices, components, and connections.

For simplicity and illustrative purposes, the principles of the present teachings are described above by referring mainly to examples of various implementations thereof. However, one of ordinary skill in the art would readily recognize that the same principles are equally applicable to, and can be implemented in, many different types of information and systems, and that any such variations do not depart from the true spirit and scope of the present teachings. Moreover, in the preceding detailed description, references are made to the accompanying figures, which illustrate specific examples of various implementations. Electrical, mechanical, logical and structural changes can be made to the examples of the various implementations without departing from the spirit and scope of the present teachings. The preceding detailed description is, therefore, not to be taken in a limiting sense and the scope of the present teachings is defined by the appended claims and their equivalents.

What is claimed is:

1. A computer-implemented method for secure access, the method comprising:
   an automated process of multiple factor authentication, the process comprising:
      storing, in a computer device, a seed value used to generate an authentication code for accessing a computer resource service, wherein the seed value is securely maintained via a self-contained security feature of the computer device;
      receiving, via a user interface of the computer device, a request to access the computer resource service, wherein the request is associated with access information for obtaining access to the computer resource service, and wherein the access information comprises at least one of a user identifier;
      obtaining the access information as a first authentication factor;
      subsequent to receiving the request to access the computer resource service, automatically generating an authentication code as a second authentication factor based at least in part on the seed value, wherein said automatically generating the authentication code includes automatically generating the authentication code without requiring user interaction with the computer device between receiving the access request and generating of the authentication code;
      automatically generating, by the computer device, an authentication request based at least in part on multiple independent factors including at least:
         the access information,
         the automatically generated authentication code, and
         a signature based on a combination of the authentication code and the access information; and
      providing the automatically generated authentication request for transmission to the computer resource service, wherein the automatically generated authentication request provided to the computer resource service includes at least the multiple independent factors of:
         the access information, the automatically generated authentication code that is based at least in part on the securely maintained seed value that is securely maintained via the self-contained security feature of the computer device, and the signature.

2. The computer-implemented method of claim 1, wherein providing the authentication request comprises:
displaying, on a display of the computer device, the authentication code, wherein the authentication code can be utilized to access the computer resource service from a second computer device.

3. The computer-implemented method of claim 1, wherein the computer resource service is a web service and wherein the authentication request is transmitted via a password login web page.

4. A non-transitory computer readable medium storing instructions that cause one or more processors of a computer system to implement multiple factor authentication that causes the one or more processors to:
obtain, by an application executing on a user device, a request to access a remote computer system, wherein the request is associated with access information for obtaining access to the remote computer system;
obtain the access information as a first authentication factor, wherein the access information comprises at least one of a user identifier or a user secret;
subsequent to receiving the request to access the remote computer system, automatically generate, by the application, an authentication code as a second authentication factor based at least in part on a seed value, wherein the seed value is securely maintained via a self-contained security feature of the user device, wherein the automatically generated authentication code is automatically generated without requiring user interaction with the user device between the access request and generation of the authentication code;
automatically generate, by the application, an authentication request based at least in part on the access information and the automatically-generated authentication code, wherein the authentication request includes at least the multiple independent factors of:
at least one of the user secret or a signature based at least in part on the user secret,
the automatically generated authentication code, and
a signature based on a combination of the authentication code and the access information; and
transmit, by the application, the automatically-generated authentication request to a remote computer system, wherein the authentication request that is transmitted to the remote computer system includes:
the at least one of the user secret or the signature based at least in part on the user secret, and
the automatically generated authentication code that is based at least in part on the securely maintained seed value that is securely maintained via the self-contained security feature of the user device, and
the signature.

5. The non-transitory computer readable medium of claim 4, further comprising instructions that cause the one or more processors of the computer system to:
generate the signature based at least in part on the user secret and the authentication code, wherein the signature is generated by an asymmetric signature algorithm or a symmetric signature algorithm.

6. The non-transitory computer readable medium of claim 4, wherein the authentication code is generated by an Initiative For Open Authentication (OATH) HOTP algorithm or OATH TOTP algorithm.

7. The non-transitory computer readable medium of claim 4, further comprising instructions that cause the one or more processors of the computer system to:
send, by the application to the remote computer system, a request for the seed value;
receive, by the application, the seed value; and
store, by the application, the seed value used to generate the authentication code.

8. The non-transitory computer readable medium of claim 7, wherein the request for the seed value is part of a request to access the remote computer system.

9. The non-transitory computer readable medium of claim 7,
wherein the request for the seed value includes identity information of the application, and
wherein a security server verifies the identity information of the application prior to sending the seed value.

10. The non-transitory computer readable medium of claim 4, further comprising instructions that cause the one or more processors of the computer system to:
generate, by the application, the seed value;
store, by the application, the seed value used to generate the authentication code; and
send, by the application, the seed value to the remote computer system.

11. The non-transitory computer readable medium of claim 4, further comprising instructions that cause the one or more processors of the computer system to:
perform a key agreement protocol to establish a shared secret between the application and the remote computer system, wherein the seed value is based on the shared secret.

12. The non-transitory computer readable medium of claim 4, wherein to obtain the authentication code the instructions cause the computer system to:
send, to a separate software resource of the user device, a request for the authentication code, wherein the separate software resource stores the seed value; and
receive, from the separate software resource, the authentication code.

13. The non-transitory computer readable medium of claim 12, wherein the separate software resource is a software library.

14. The non-transitory computer readable medium of claim 4, further comprising instructions that cause the one or more processors of the computer system to:
determine, by the application, a security policy governing access to the remote computer system, wherein the security policy comprises at least one of a location-based policy, a time-based policy, a device fingerprinting policy, and access attempts policy; and
verify, by the application, that the request to access the remote computer system complies with the security policy.

15. The non-transitory computer readable medium of claim 14, further comprising instructions that cause the one or more processors of the computer system to:
provide, based on the security policy, an interface to receive the access information.

16. The non-transitory computer readable medium of claim 4, further comprising instructions that cause the one or more processors of the computer system to:
receive, by the application, a request for a second authentication code for accessing the remote computer system;

automatically obtain, by the application, the second authentication code that is generated based at least in part on the seed value; and provide, by the application, the second authentication code to a second device to provide the second device access to the remote computer system.

17. The non-transitory computer readable medium of claim 16, wherein to provide the second authentication code the instructions cause the one or more processors of the computer system to:

display the second authentication code on a display of the user device to enable input of the second authentication code into the second device.

18. The non-transitory computer readable medium of claim 16, wherein to provide the second authentication code the instructions cause the one or more processors of the computer system to:

transmit the second authentication code to the second device via a wireless protocol.

19. The non-transitory computer readable medium of claim 16, wherein the request for the second authentication code is received from the remote computer system.

20. A system for providing secure access, the system comprising:

a secure memory of a device for storing a seed value, wherein the seed value is securely maintained in the secure memory via a self-contained security feature of the device; and one or more processors coupled to the secure memory and configured to:

receive a request to access a remote computer system, wherein the request is associated with access information for obtaining access to the remote computer system;

obtain the access information as a first authentication factor;

subsequent to the receipt of the request to access the remote computer system, automatically generate an authentication code as a second authentication factor that is generated based at least in part on the seed value, wherein said automatically generate the authentication code includes automatically generate the authentication code without requiring user interaction with the device between receipt of the access request and generation of the authentication code;

automatically generate an authentication request based at least in part on multiple independent factors including at least:

the access information, the automatically generated authentication code, and a signature based on a combination of the authentication code and the access information; and transmit the automatically generated authentication request to the remote computer system, wherein the authentication request includes at least the multiple independent factors of:

the access information, the automatically generated authentication code that is based at least in part on the securely maintained seed value that is securely maintained via the self-contained security feature, and the signature.

21. The system of claim 20, the system further comprising: a secure processor coupled to the secure memory and configured to generate the authentication code based at least in part on the seed value.

22. The system of claim 20, wherein the secure memory stores a plurality of seed values used to generate authentication codes for accessing computer systems;

wherein the request to access the remote computer system is associated with a first application accessing the remote computer system; and wherein the one or more processors are configured to:

determine that the seed value corresponds to the first application and the remote computer system;

automatically generate the authentication code based at least in part on the seed value in response to receipt of the access request; and provide the authentication code to the first application.

23. The system of claim 22, wherein the one or more processors are configured to:

receive, from a second application, a request for a second authentication code associated with accessing the remote computer system;

determine a second seed value that corresponds to the second application and the remote computer system;

automatically generate the second authentication code based at least in part on the second seed value in response to receipt of the request; and provide the second authentication code to the second application.

24. The system of claim 22, wherein the one or more processors are configured to:

receive, from a second application, a request for a second authentication code associated with accessing a second remote computing system;

determine a second seed value that corresponds to the second application and the second remote computer system;

automatically generate the second authentication code based at least in part on the second seed value in response to receiving the request; and provide the second authentication code to the second application.

* * * * *